US009787876B1

(12) United States Patent
Kajiyama et al.

(10) Patent No.: US 9,787,876 B1
(45) Date of Patent: Oct. 10, 2017

(54) MOBILE IMAGE FORMING APPARATUS

(71) Applicant: FUJI XEROX CO., LTD., Tokyo (JP)

(72) Inventors: Hajime Kajiyama, Yokohama (JP);
Hideki Fujimoto, Yokohama (JP);
Kunitoshi Yamamoto, Yokohama (JP);
Mariko Miyazaki, Yokohama (JP);
Naoya Ogata, Yokohama (JP); Akira Ichikawa, Yokohama (JP); Tetsuya Kobayashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/222,384

(22) Filed: Jul. 28, 2016

(30) Foreign Application Priority Data

Mar. 24, 2016 (JP) ................. 2016-059313

(51) Int. Cl.
*G06F 3/12* (2006.01)
*H04N 1/44* (2006.01)
*H04N 1/00* (2006.01)

(52) U.S. Cl.
CPC ....... *H04N 1/4413* (2013.01); *H04N 1/00204* (2013.01); *H04N 1/00244* (2013.01); *H04N 1/00251* (2013.01); *H04N 1/00347* (2013.01); *H04N 2201/0039* (2013.01); *H04N 2201/0094* (2013.01)

(58) Field of Classification Search
CPC ... G06F 3/1291; G06F 3/1292; H04N 1/4406; H04N 1/4413; H04N 1/00347
USPC ................................ 358/1.14, 1.15
See application file for complete search history.

(56) References Cited

U.S. PATENT DOCUMENTS

| 2014/0309835 | A1 | 10/2014 | Yamamoto |
| 2014/0365060 | A1* | 12/2014 | Yamamoto ............... G05D 1/02 701/23 |
| 2015/0153970 | A1 | 6/2015 | Tomida et al. |
| 2015/0378652 | A1 | 12/2015 | Sakurai |

FOREIGN PATENT DOCUMENTS

| JP | 2014-071845 A | 4/2014 |
| JP | 2014-209293 A | 11/2014 |
| JP | 2015-001863 A | 1/2015 |
| JP | 2016-012878 A | 1/2016 |

OTHER PUBLICATIONS

Aug. 1, 2017 Search Report issued in European Patent Application No. 16186807.0.

* cited by examiner

*Primary Examiner* — Eric A Rust
(74) *Attorney, Agent, or Firm* — Oliff PLC

(57) ABSTRACT

A service providing system includes a client apparatus that gives an instruction to provide a service according to an operation of the client apparatus by a user, a mobile apparatus that receives the instruction to provide the service, moves to the user who has performed the operation, performs authentication of the user, and provides the service to the user, and a stationary apparatus that is placed on a fixed position and provides a service. In a case where the authentication of the user fails although the mobile apparatus receives the instruction to provide the service and moves to the user who has performed the operation, the mobile apparatus stops the providing of the service and entrusts the stationary apparatus with the providing of the service.

8 Claims, 14 Drawing Sheets

MOBILE IMAGE FORMING APPARATUS

CROSS-REFERENCE TO RELATED APPLICATIONS

This application is based on and claims priority under USC 119 from Japanese Patent Application No. 2016-059313 filed on Mar. 24, 2016.

BACKGROUND

Technical Field

The present invention relates to a service providing system, a mobile apparatus, a server apparatus, a service providing method, and a recording medium.

Related Art

Systems that are self-propelled in a predetermined space such as an office and provide services have been proposed.

SUMMARY

According to an aspect of the invention, there is provided a service providing system, including: a client apparatus that gives an instruction to provide a service according to an operation of the client apparatus by a user; a mobile apparatus that receives the instruction to provide the service, moves to the user who has performed the operation, performs authentication of the user, and provides the service to the user; and a stationary apparatus that is placed on a fixed position and provides a service. In a case where the authentication of the user fails although the mobile apparatus receives the instruction to provide the service and moves to the user who has performed the operation, the mobile apparatus stops the providing of the service and entrusts the stationary apparatus with the providing of the service.

BRIEF DESCRIPTION OF DRAWINGS

Exemplary embodiments of the present invention will be described in detail based on the following figures, wherein.

DETAILED DESCRIPTION

Hereinafter, an exemplary embodiment of the present invention will be described.

Figure 1:
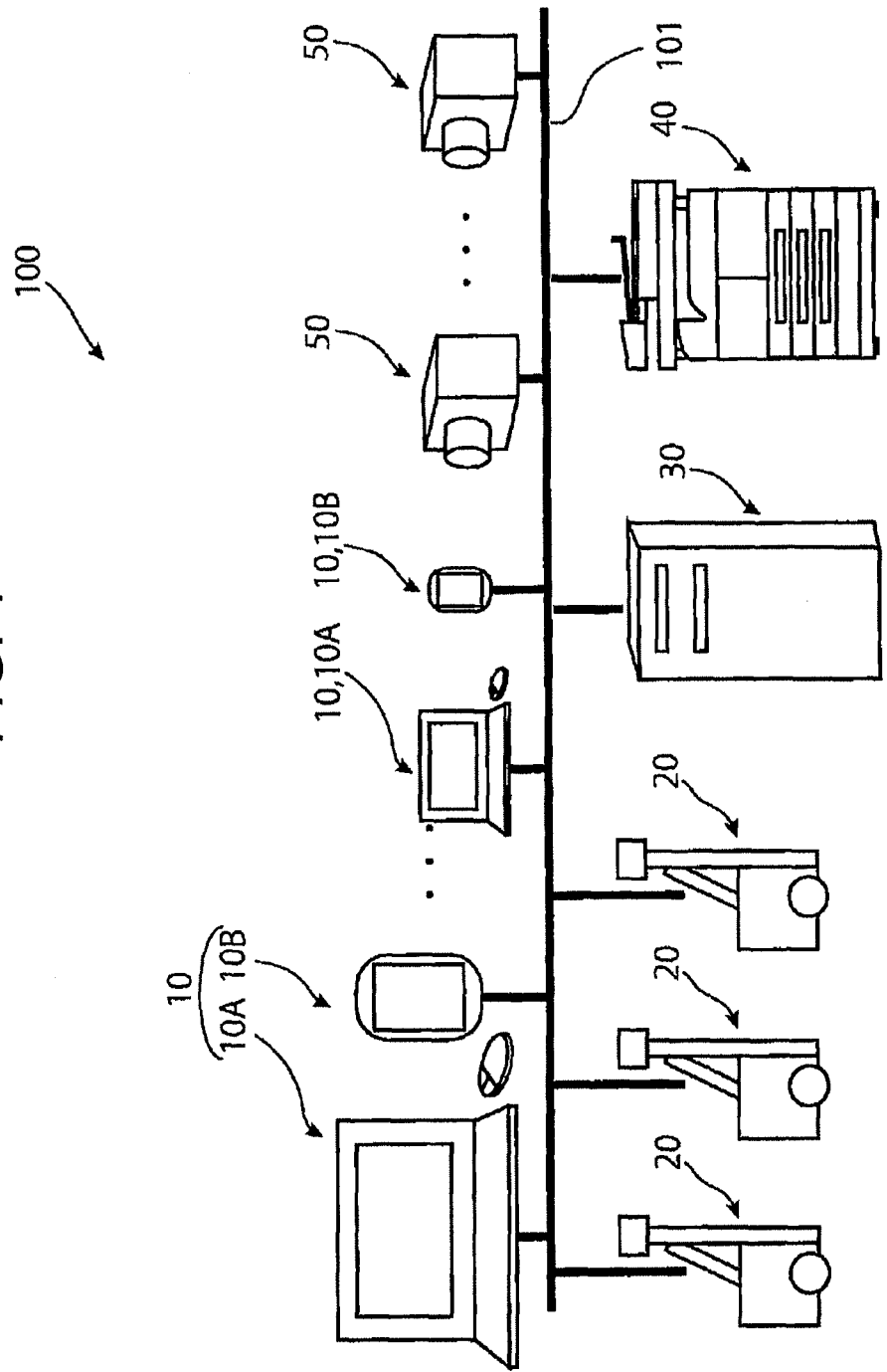
FIG. 1 is a diagram illustrating an overall configuration of a print system as an exemplary embodiment of a service providing system according to the present invention.

FIG. 1 is a diagram illustrating an overall configuration of a print system as an exemplary embodiment of a service providing system according to the present invention.

A print system 100 is a system that includes a self-propelled printer 20, and the self-propelled printer 20 moves to the user according to a print output instruction given from the user and performs print output after performing user authentication.

The print system 100 includes plural laptop personal computers (hereinafter, referred to as "laptop PCs") 10A or mobile terminals 10B (hereinafter, referred to as "mobile terminals"). A client apparatus 10 is constituted by the laptop PC 10A or the mobile terminal 10B independently or constituted such that the laptop PC 10A and the mobile terminal 10B synchronized with each other by the same user are paired with each other. As will be described later in detail, a print output instruction is given through in each of the client apparatuses 10.

The print system 100 includes three self-propelled printers 20 as an example. The self-propelled printer 20 corresponds to an example of a mobile apparatus. Each of the self-propelled printers 20 moves near a seat of the user that has given the print output instruction, undergoes user authentication, and performs a print output. The details thereof will be described later.

The print system 100 further includes a server apparatus 30. The server apparatus 30 receives the print output instruction transmitted from each of the client apparatuses 10, allocates the print instruction to any one of the three self-propelled printers 20, transfers a file to be printed to the allocated self-propelled printer 20, further designates a position to which the allocated self-propelled printer 20 has to move, and instructs the allocated self-propelled printer 20 to move the position and perform the print output.

The print system 100 includes a stationary multifunction machine 40. The multifunction machine 40 is an apparatus having plural complex functions such as a scanner function and a copying function in addition to a printer function. The multifunction machine 40 corresponds to an example of a stationary apparatus.

The print system 100 further includes plural cameras 50. The cameras 50 are installed on a wall, a ceiling, or the like of an office 60 described with reference to FIG. 2 and used to monitor whether or not the user is sitting on his/her seat. The details thereof will be described later.

The client apparatuses 10, the self-propelled printers 20, the server apparatus 30, the multifunction machine 40, and the cameras 50 illustrated in FIG. 1 are connected a wireless local area network (LAN) 101 to be able to perform communication with one another.

Each of the client apparatuses 10, the self-propelled printers 20, the server apparatus 30, and the multifunction machine 40 has a function of an arithmetic processing device that executes a program and performs a process or an operation according to an executed program.

The print system 100 illustrated in FIG. 1 is arranged in an office having a layout to be described below as an example.

Figure 2:
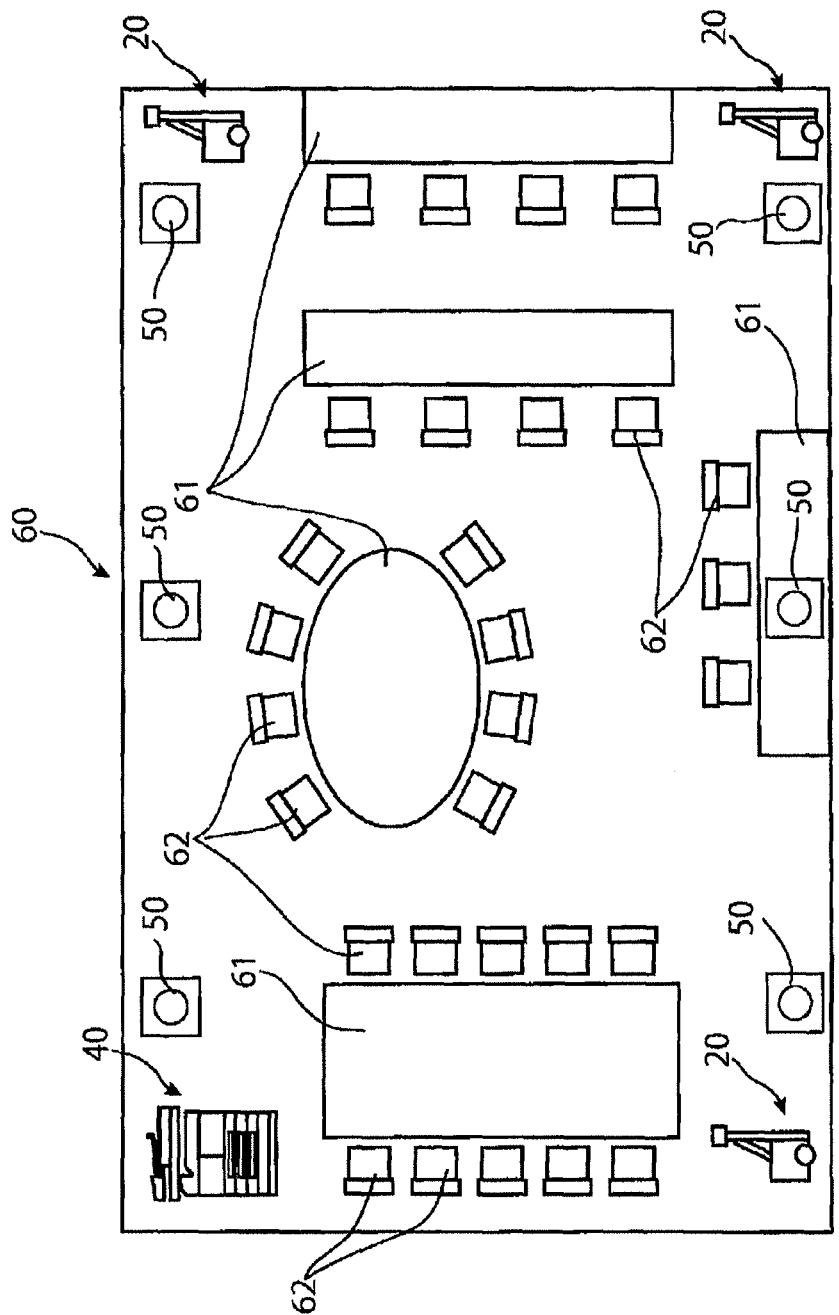
FIG. 2 is a schematic layout diagram illustrating an inside of an office.

FIG. 2 is a schematic layout diagram illustrating an inside of the office.

In the office 60, plural the table 61 or plural chairs 62 are arranged. Each of the chairs 62 is given a unique seat number.

The three self-propelled printers 20 illustrated in FIG. 1 are disposed in the office 60. The positions of the three self-propelled printers 20 illustrated in FIG. 2 are standby positions of the self-propelled printers 20 in the office 60. A charging facility (not illustrated) is installed at each of the standby positions, and each of the self-propelled printers 20 configured to move to the standby position, be charged by the charging facility, move by the energy, and perform the print output.

The multifunction machine 40 illustrated in FIG. 1 is installed in the office 60.

The plural cameras 50 illustrated in FIG. 1 are installed at the wall or the ceiling of the office 60. The camera 50 is a camera used to monitor whether the user is sitting on his/her seat or has left his/her seat and corresponds to an example of a sitting recognizing apparatus.

Here, in this exemplary embodiment, the office 60 employs a system in which a fixed seat (chair 62) is not allocated to each user including the user having authority capable of using the office 60, and the users sit on an empty seat (chair 62) when entering the office 60 and does work. In this exemplary embodiment, in this system, the users undergo an entrance process at the entrance (not illustrated) of the office 60 when entering the office 60, and at this time, a one-day user ID is allocated, and the users receive an IC card having the user ID recorded therein and then enter the office 60. The user ID allocated at the time of entrance is not only recorded in the IC card but also transmitted to the server apparatus 30 (which is not illustrated in FIG. 2, see FIG. 1) and registered in association with the user. The IC card having the user ID recorded therein is carried by the user and returned when the user leaves the office 60.

The print system 100 installed in the office 60 is a system in which, when the user who started the work operates his/her client apparatus 10 (the laptop PC 10A or the mobile terminal 10B) and gives the print output instruction, one of the self-propelled printers 20 moves to the user, performs authentication as to whether or not the user has given the print output instruction, and performs the print output.

Figure 3:
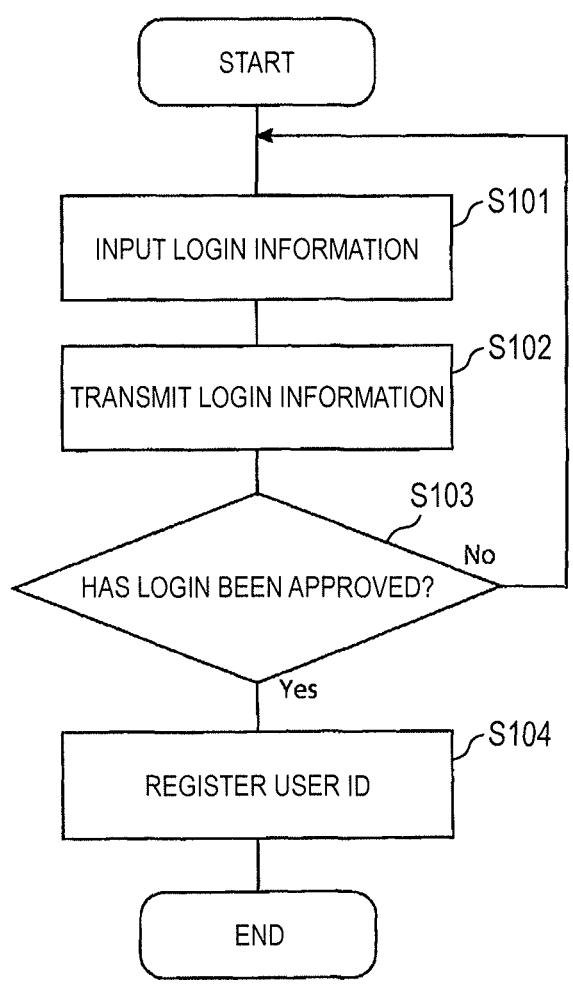
FIG. 3 is a diagram illustrating a process flow of a client apparatus in a login scene.

FIG. 3 is a diagram illustrating a process flow of the client apparatus in a login scene.

Figure 4:
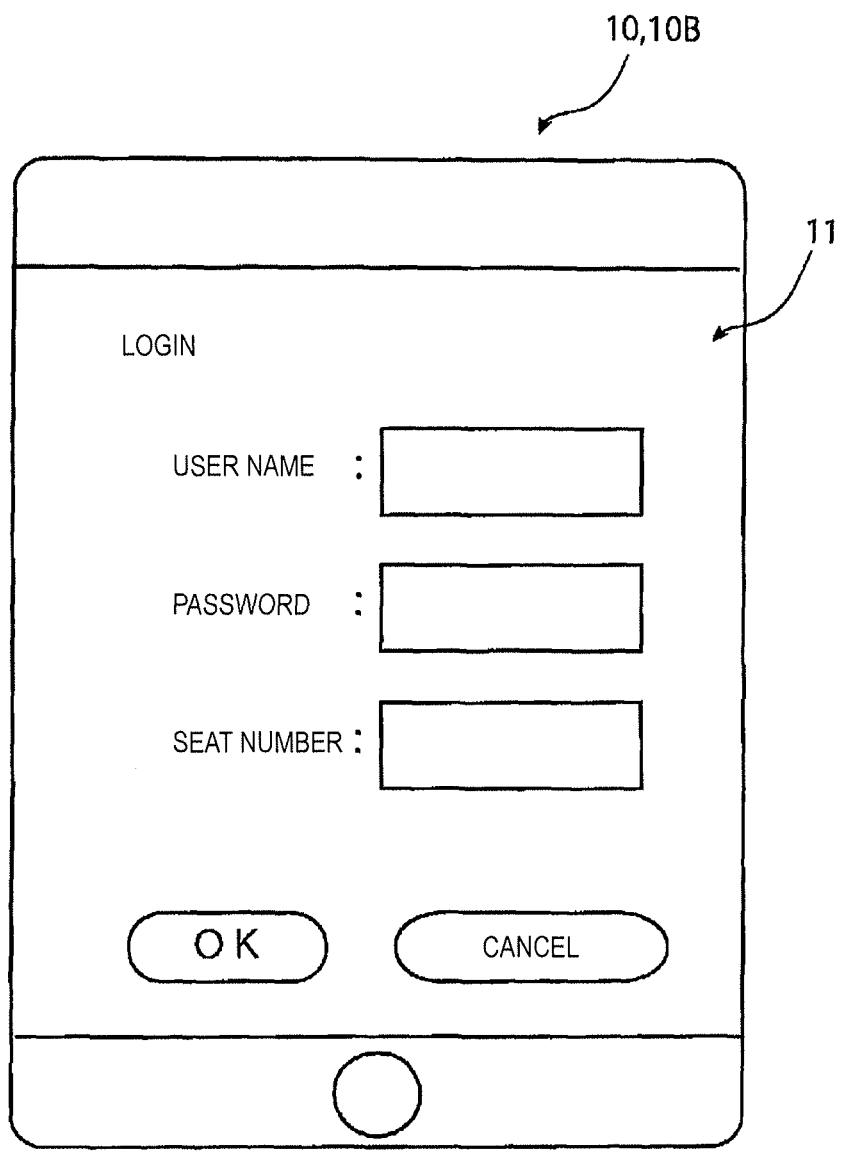
FIG. 4 is a diagram illustrating a login screen.

FIG. 4 is a diagram illustrating a login screen.

This exemplary embodiment will be described under the assumption that the mobile terminal 10B is used as the client apparatus 10. It is obvious that the laptop PC 10A is used as the client apparatus 10, or one user uses the laptop PC 10A and the mobile terminal 10B differently according to a scene, and here, it is not particularly concerned with a difference in usage.

After completing the entrance process, the user enters the office 60 illustrated in FIG. 2 and sits on any one of the empty seats (chairs 62) in the office 60. Then, the user operates his/her client apparatus 10 and performs a login operation for starting to use the print system 100 installed in the office 60.

In order to perform the login operation, first, an application program (hereinafter, referred to as an "application") for using the print system 100 is activated. At this time, a login screen illustrated in FIG. 4 is displayed on a display screen 11 of the client apparatus 10 (here, the mobile terminal 10B is assumed as described above).

Here, a user name, a password, and a seat number are input through an operation by the user on the login screen (step S101 of FIG. 3). Then, when the information is input on the login screen of FIG. 4 and then an "OK" button is pushed, the information is transmitted to the server apparatus 30 (see FIG. 1) (step S102). Upon receiving a notification indicating that the current login has been approved from the server apparatus 30 (step S103), the user ID transmitted together with the login approval is registered in the client apparatus 10 (step S104), and the current login process ends. On the other hand, when a notification indicating that the login has been rejected is received from the server apparatus 30 (step S103), the information is re-input on the login screen illustrated in FIG. 4 (step S101).

Figure 5:
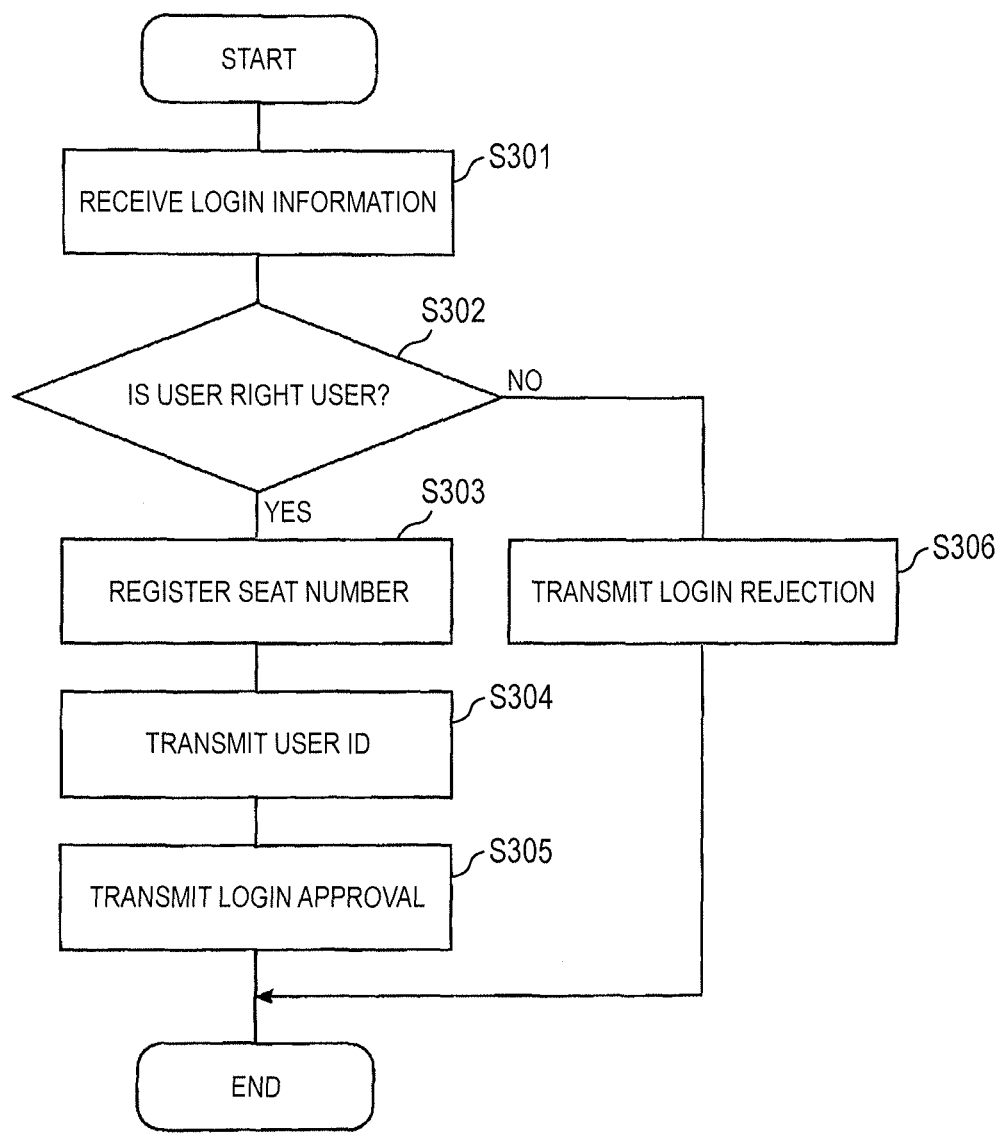
FIG. 5 is a diagram illustrating a process flow of a server apparatus in a scene in which login information is transmitted from a client apparatus.

FIG. 5 is a diagram illustrating a process flow of the server apparatus in a scene in which the login information is transmitted from the client apparatus.

Here, first, the login information transmitted from the client apparatus 10 is received (step S301).

The server apparatus 30 includes a user database in which the user names and the passwords of all the users having authority capable of using the office 60 are stored in associated with each other. In the user database, the user ID allocated when the user enters the office is associated and stored.

Upon receiving the login information (step S301), the server apparatus 30 compares the user name and the password included in the login information with the user name and the password stored in the user database and determines whether or not the user is the right user having authority capable of using the office 60 (step S302). When the user is the right user, the seat number included in the login information is registered in the user database in association with the user (step S303), then the login approval is transmitted to the client apparatus 10 (step S304), and the ID number of the user stored in the user database is further transmitted to the client apparatus 10 (step S305).

On the other hand, when the user is determined not to be recognized as the right user based on the current login information (step S302), the login rejection is transmitted to the client apparatus 10 that has transmitted the login information (step S306).

The process of the client apparatus 10 that has received the login approval or the login rejection has already been described above (see FIG. 3).

Next, a scene used for instructing the print output after the login will be described.

Figure 6:
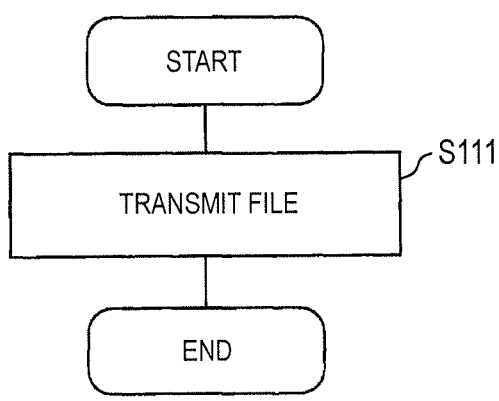
FIG. 6 is a diagram illustrating a process flow of a client apparatus 10 in a scene in which a print output instruction is given.

FIG. 6 is a diagram illustrating a process flow of a client apparatus 10 in a scene used for instructing the print output.

Figure 7:
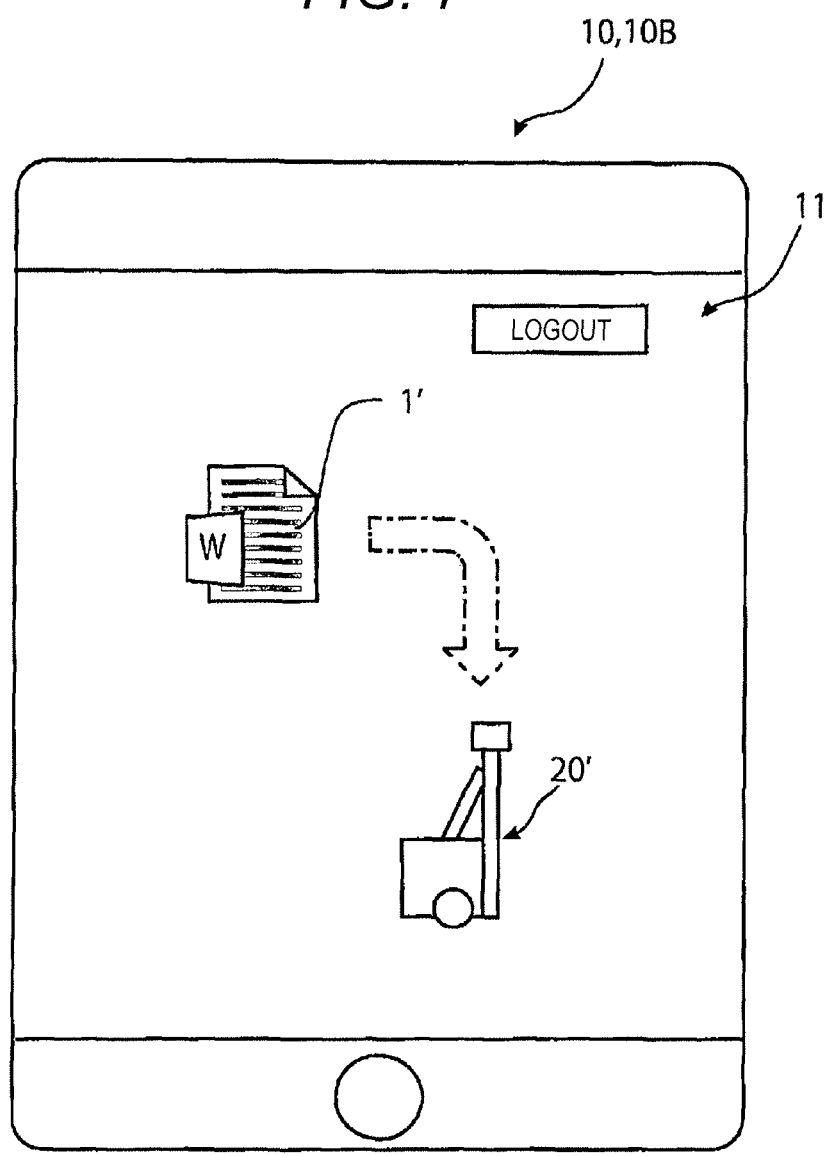
FIG. 7 is a diagram illustrating a print instruction screen displayed on a display screen of a client apparatus 10.

FIG. 7 is a diagram illustrating a print instruction screen displayed on the display screen of the client apparatus 10.

When the login is performed as described above, a mark 20' of the self-propelled printer 20 is displayed on the display screen of the client apparatus 10.

A mark 1' indicating a file desired to be printed or a shortcut of the file is displayed on the display screen, and a drag and drop operation is performed so that the mark 1' overlaps the mark 20' of the self-propelled printer. As a result, the file corresponding to the mark 1' is transmitted to the server apparatus 30 together with the user ID (step S111 in FIG. 6). This transmission means the print output instruction.

Figure 8:
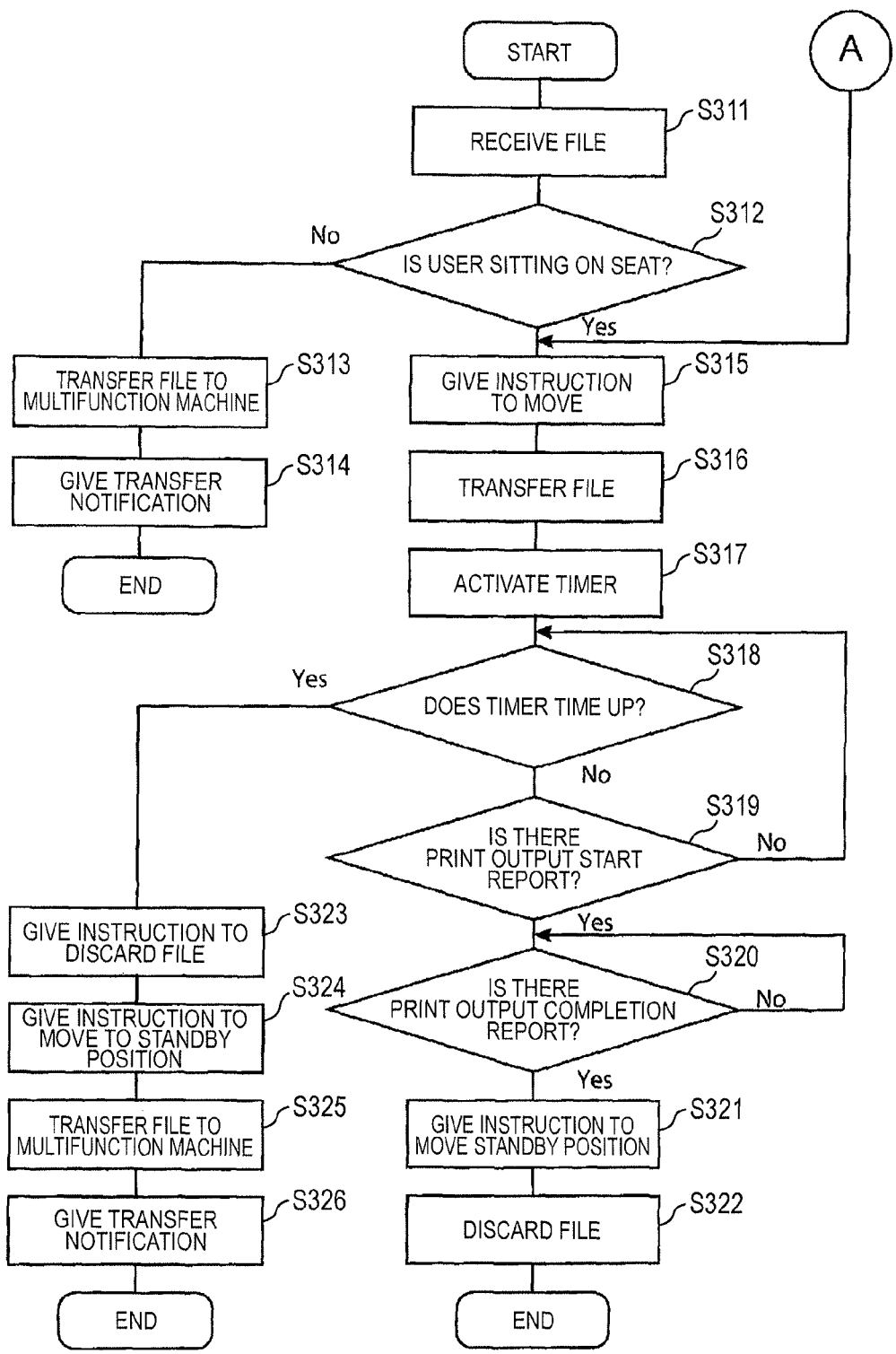
FIG. 8 is a diagram illustrating a process flow of a server apparatus in a scene in which a file is received from a client apparatus, that is, a scene in which a print output instruction is received.

FIG. 8 is a diagram illustrating a process flow of a server apparatus in a scene in which a file is received from the client apparatus, that is, a scene in which the print output instruction is received.

Upon receiving the file (the print output instruction) (step S311), the server apparatus 30 recognizes the current seat number of the user that is registered in association with the same user ID registered in the user database with reference to the user database using the user ID that is attached to the file and transmitted as a keyword, acquires the position information of the seat (the chair 62) based on the seat number, and determines whether or not a person is sitting on the seat (chair 62) using the camera 50 (step S312). Here, in this exemplary embodiment, when a person is sitting on the seat, the right user is estimated to be sitting on the seat, and strictness as to whether or not the person sitting on the seat is the right user is not inquired.

When the seat is empty, the file and the user ID are transferred to the multifunction machine 40 (see FIGS. 1 and 2) (step S313), and a notification indicating that the file has been transferred to the multifunction machine 40 is transmitted to the client apparatus 10 that has given the print output instruction (step S314). It is because, when the seat is empty, it is meaningless to send the self-propelled printer 20 to the seat. The transfer notification will be described in detail together with a description of the transfer notification in step S326 which will be described later.

When the seat of the user is not empty (step S312), the server apparatus 30 selects one of the self-propelled printers 20 notifies the selected self-propelled printer 20 of the position of the seat of the user, and gives an instruction so that the self-propelled printers 20 moves to the position (step S315).

Here, the three self-propelled printers 20 are disposed on the floor of the office 60 illustrated in FIG. 2, the self-propelled printer 20 to which the current print output is assigned among the three self-propelled printers 20 is determined by a predetermined algorithm. For example, when the two self-propelled printers 20 are operating different print output operations, and one self-propelled printer 20 is in the standby state, one self-propelled printer 20 in the standby state is currently used. When the two or more self-propelled printers 20 are in the standby state, the self-propelled printer 20 at the position close to the destination is used. Alternatively, when there is a difference in a print output capability among the three self-propelled printers 20, for example, the two self-propelled printers 20 are suitable for a small amount of print output, and one self-propelled printer 20 is suitable for a large amount of print output, and a large amount of print output is scheduled to be performed as the current print output, the self-propelled printer suitable for a large amount of print output is used.

The server apparatus 30 further transmits a file for the current print output to the selected self-propelled printer 20 together with the user ID (step S316). Then, a timer is activated (step S317). The timer is a timer for measuring a sufficient time until the self-propelled printer 20 moves to the seat of the user, and the user authentication is completed. A time-up time of the timer may be a time that varies, for example, according to a distance between the self-propelled printer 20 moving to the user and the seat of the user.

The self-propelled printer 20 includes an IC card reader, the self-propelled printer 20 moving to the user reads the user ID recorded in the IC card of the user through the IC card reader, performs the user authentication, gives a print output start report to the server apparatus 30 when the user is confirmed to be the right user, and then performs the print output. Then, when the print output is completed, the self-propelled printer 20 gives the server apparatus 30 a report indicating that the current print output has been completed.

Upon receiving the print output start report from the self-propelled printer 20 instructed to move to the user before the timer activated in step S317 times up (step S318) (step S319), the server apparatus 30 waits for reception of a print output completion report from the self-propelled printer 20 (step S320), instructs the self-propelled printer 20 to move to the standby position (step S321), and discards the file for the current print output which is stored in the server apparatus 30 (step S322). The file transferred to the self-propelled printer 20 in step S316 is discarded by the self-propelled printer 20 when the print output is completed in the self-propelled printer 20.

When the timer times up before the print output start report (step S319) arrives from the self-propelled printer 20 (step S318), the server apparatus 30 gives an instruction to discard the file for the current print output held in the self-propelled printer 20 (step S323) and an instruction to move to the standby position (step S324) to the self-propelled printer 20. Thus, the self-propelled printer 20 discards the file and starts to move to the standby position.

The server apparatus 30 further transfers the file for the current print output to the multifunction machine 40 (step S325), and gives a transfer notification to the client apparatus 10 that has given the instruction to perform the current print output (step S326).

Figure 9:
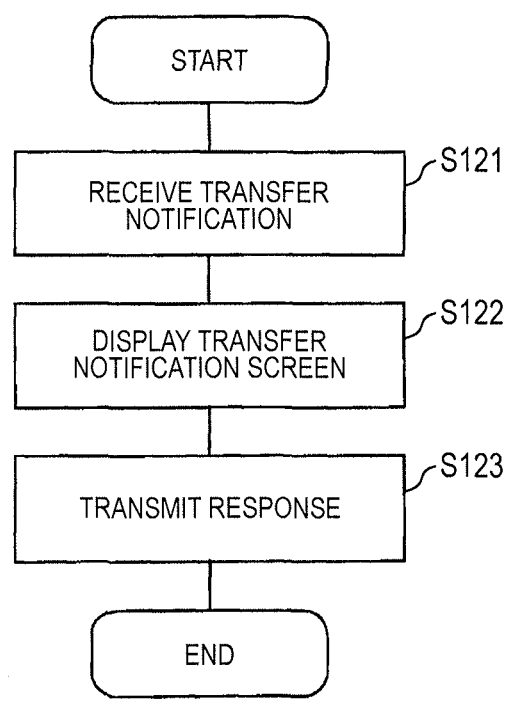
FIG. 9 is a diagram illustrating a process flow of a client apparatus 10 that has received a transfer notification.

FIG. 9 is a diagram illustrating a process flow of the client apparatus 10 that has received the transfer notification.

Figure 10:
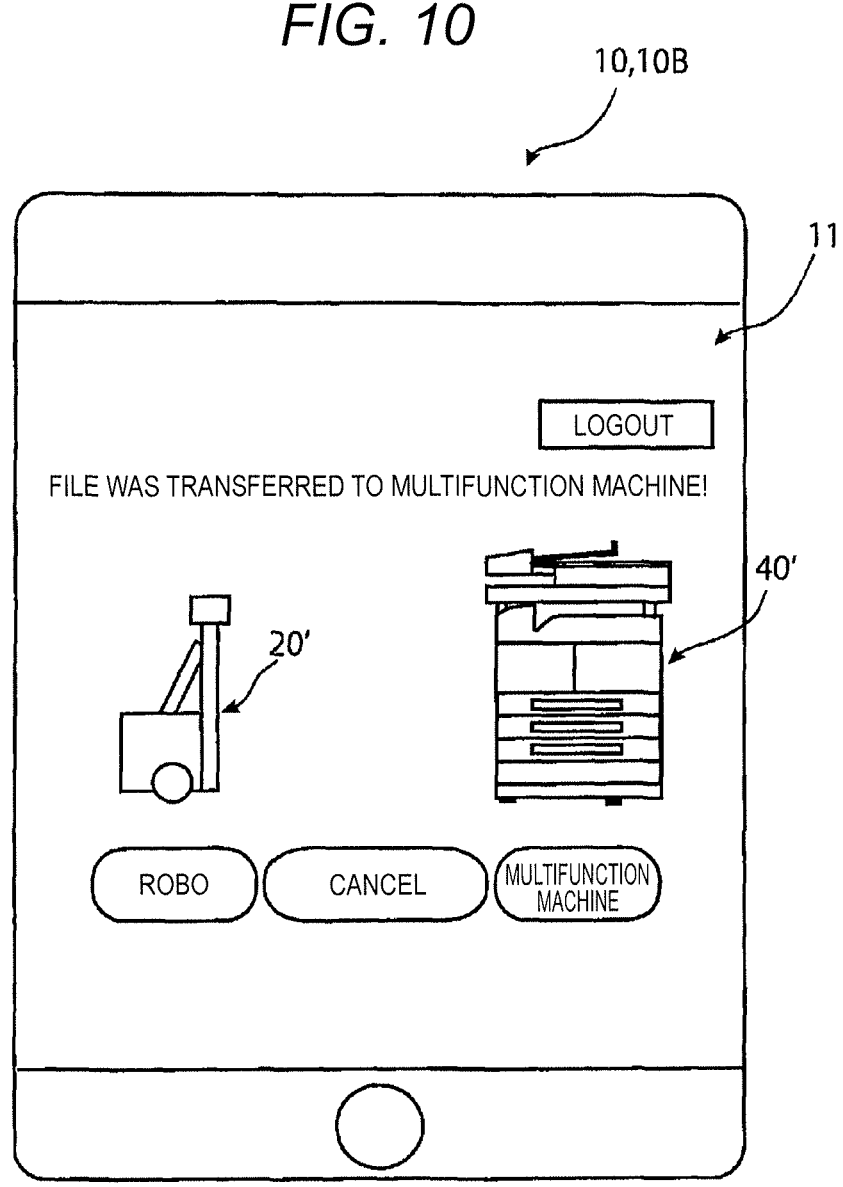
FIG. 10 is a diagram illustrating a transfer notification screen.

FIG. 10 is a diagram illustrating a transfer notification screen. The transfer notification screen of FIG. 10 is displayed on the display screen of the client apparatus 10 that has received the transfer notification in either of step S314 and step S326 in FIG. 8.

When the transfer notification transmitted from the server apparatus 30 is received by the client apparatus 10 (step S121), the transfer notification screen illustrated in FIG. 10 is displayed on the display screen 11 of the client apparatus 10 (step S122). The user of the client apparatus 10 confirms the transfer notification screen, and pushes one of three buttons, that is, "Robo," "cancel," and "multifunction machine" buttons. "Robo" is a nickname of the self-propelled printer 20, and the "Robo" button is a button used to give an instruction to perform the print output through the self-propelled printer 20. The "cancel" button is a button that is used to give an instruction to cancel the current print instruction, and the "multifunction machine" button is a button used to indicate that the print output in the multifunction machine 40 is accepted.

When any one of the three buttons is pushed, a response corresponding to the pushed button is transmitted from the client apparatus 10 to the server apparatus 30 (step S123).

Figure 11:
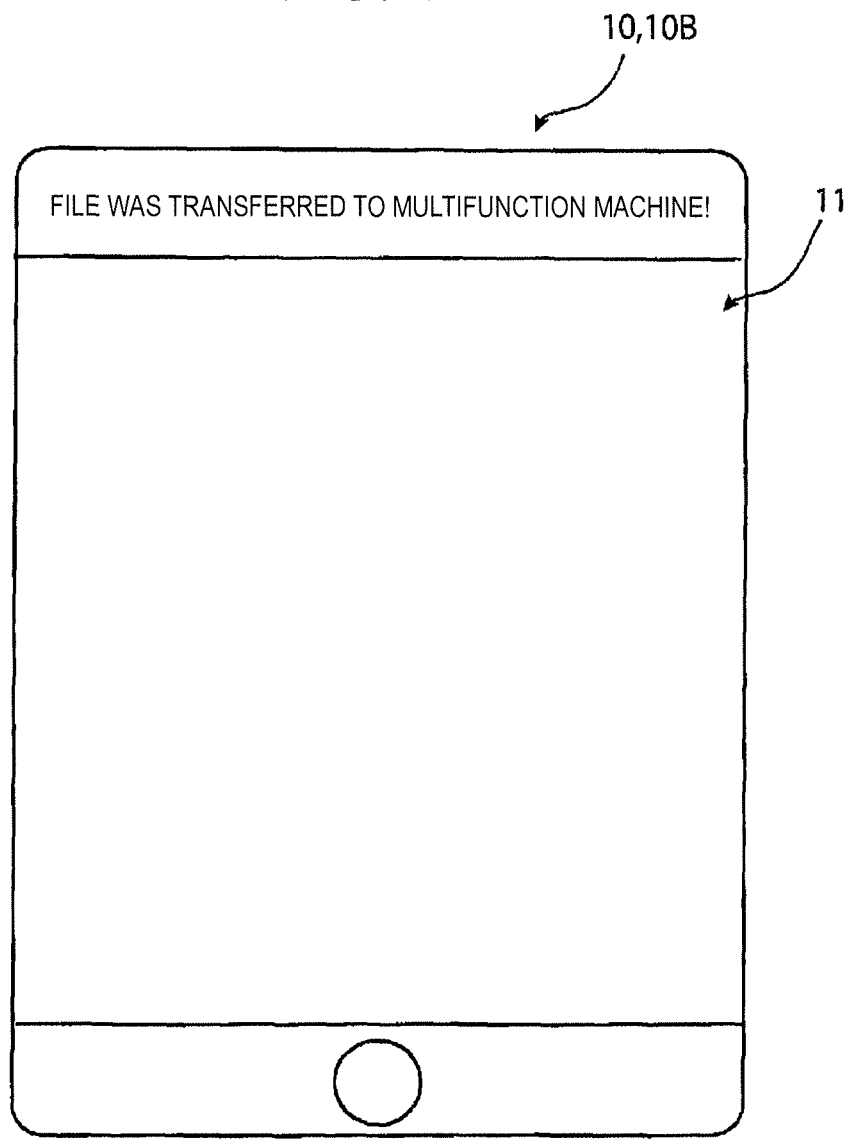
FIG. 11 is a diagram illustrating a notification display screen on a display screen of a client apparatus 10.

FIG. 11 is a diagram illustrating a notification display screen on the display screen of the client apparatus 10.

When the transfer notification is transmitted from the server apparatus 30, but the application for using the print system is not activated in the client apparatus 10, a file transfer message illustrated in FIG. 11 is displayed on the display screen of the client apparatus 10. Here, since the mobile terminal 10B is assumed as the client apparatus 10, the display illustrated in FIG. 11 (notification display) is appeared on the display screen 11 of the mobile terminal 10B. When the client apparatus 10 is the laptop PC 10A (see FIG. 1), when the application is not activated, a message having the same content as the message illustrated in FIG. 11 is displayed on the display screen of the laptop PC 10A in the form of a balloon.

When the user confirms the message illustrated in FIG. 11 and activates the application, the transfer notification screen illustrated in FIG. 10 is displayed on the display screen of the client apparatus 10, and the instruction is given on the transfer notification screen.

Figure 12:
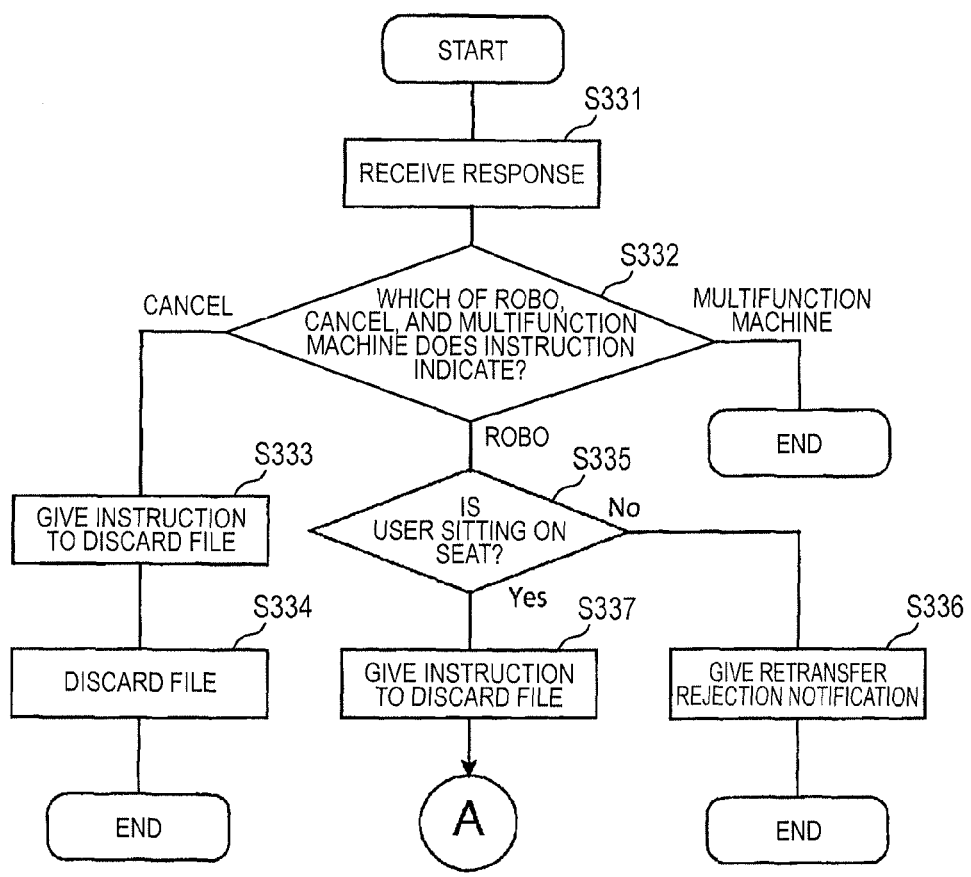
FIG. 12 is a diagram illustrating a process flow of a server apparatus in a scene in which a response to a transfer notification is transmitted from a client apparatus that has received the transfer notification.

FIG. 12 is a diagram illustrating a process flow of the server apparatus in a scene in which a response to the transfer notification is transmitted from the client apparatus that has received the transfer notification.

Upon receiving the response to the transfer notification (step S331), the server apparatus 30 determines whether an instruction by the response is retransfer to the self-propelled printer 20 (pushing of the "Robo" button on the transfer notification screen illustrated in FIG. 10), cancellation (pushing of the "cancel" button), or acceptance of the print output in the multifunction machine 40 (pushing of the "multifunction machine" button) (step S332). When the response is "multifunction machine," the process according to this process flow ends with doing nothing. When the response is "cancel," an instruction to discard the current file is given to the multifunction machine 40 (step S333), and the file stored in the server apparatus 30 is discarded from the server apparatus 30 (step S334). The multifunction machine 40 receives the instruction to discard the file and discards the file.

When the instruction of the retransfer to the self-propelled printer 20 (the pushing of the "Robo" button) is given, it is determined whether or not the user is sitting on the seat using the camera 50 (step S335). Then, when the user did not return to the seat yet, a retransfer rejection notification is transmitted to the client apparatus 10 of the user (step S336).

Figure 13:
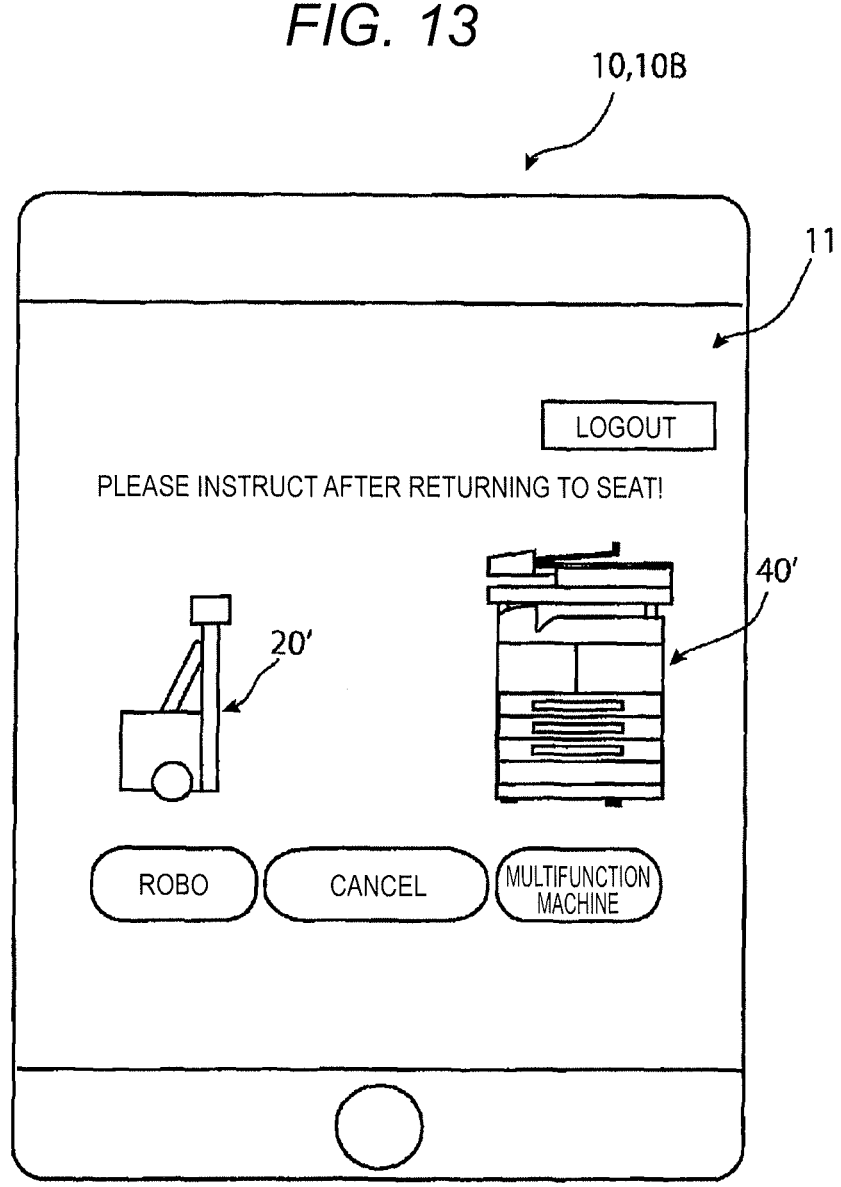
FIG. 13 is a diagram illustrating a retransfer rejection notification screen.

FIG. 13 is a diagram illustrating the retransfer rejection notification screen.

The retransfer rejection notification screen illustrated in FIG. 13 has a similar design to the transfer notification screen illustrated in FIG. 10 but has a different message from the transfer notification screen illustrated in FIG. 10, and a message "please instruct after returning to seat!" is displayed on the retransfer rejection notification screen. The same instruction as the instruction input on the transfer notification screen illustrated in FIG. 10 can be input on the retransfer rejection notification screen as well. A process of the client apparatus 10 when the retransfer rejection notification is received is the same as the process when the transfer notification illustrated in FIG. 9 is received, and a duplicated description is omitted. Even when the instruction is given on the retransfer rejection notification screen, the process according to the process flow illustrated in FIG. 12 is performed in the server apparatus 30.

Referring back to FIG. 12, the description is continued.

When the instruction transmitted from the client apparatus 10 is "Robo," and the user is determined to be sitting on the seat (step S335), the server apparatus 30 gives an instruction to discard the current file to the multifunction machine 40 (step S337). The multifunction machine 40 receives the instruction and discards the file. Thereafter, the server apparatus 30 performs the process subsequent to step S315 in FIG. 8. Here, a duplicated description is omitted.

When the user desires to perform the print output based on the file transferred to the multifunction machine 40 through the multifunction machine 40, the user goes to an installation position of the multifunction machine 40 (see FIG. 2). The multifunction machine 40 is equipped with the IC card reader as well, similarly to the self-propelled printer 20. The user who went to the position of the multifunction machine 40 passes his/her IC card over the multifunction machine so that the multifunction machine 40 authenticates that the user is the right user. Then, the multifunction machine 40 performs the print output based on the file, transmits the print output completion report to the server apparatus 30 when the print output is completed, and discards the current file from the multifunction machine 40.

Figure 14:
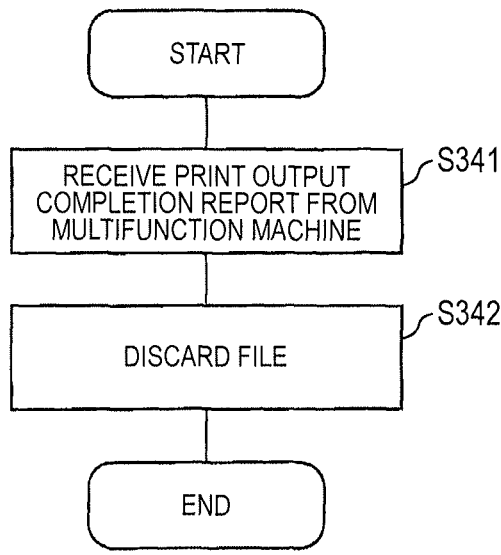
FIG. 14 is a diagram illustrating a process flow of a server apparatus when a print output completion report is transmitted from a multifunction machine.

FIG. 14 is a diagram illustrating a process flow of a server apparatus when the print output completion report is transmitted from the multifunction machine.

Upon receiving the print output completion report transmitted from the multifunction machine 40 (step S341), the server apparatus 30 discards the file for the current print output stored in the server apparatus 30 (step S342).

Figure 15:
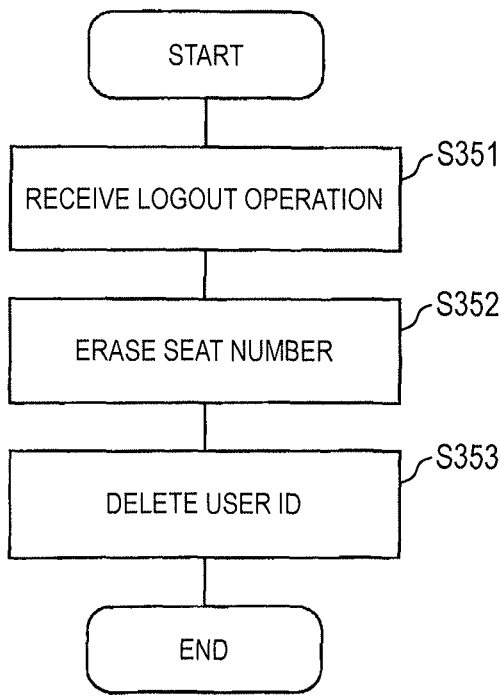
FIG. 15 is a diagram illustrating a process flow of a server apparatus at the time of logout.

FIG. 15 is a diagram illustrating a process flow of a server apparatus at the time of logout.

The user performs a logout operation using his/her client apparatus 10 when wrapping up the work for the day in the office 60 (see FIG. 2). Upon receiving the logout operation (step S351), the server apparatus 30 erases the current seat number of the user (step S352), and further deletes the user ID of the user allocated at the time of entrance (step S353). After performing the logout operation, the user returns the IC card to the reception, and leaves the office 60.

As described above, according to the print system 100 of this exemplary embodiment, it is possible to retain the service in which the self-propelled printer 20 performs the print output at the seat of the user, and even in the scene in which it is difficult to get the authentication since the user is away from the seat, it is possible to prevent the print output delay while effectively operating the self-propelled printer 20.

In the print system 100 according to this exemplary embodiment, the print output service is provided at the seat of the user except when it is transferred to the multifunction machine 40, and the self-propelled printer 20 starts to move toward the seat of the user at a point in time when the print instruction is performed, but the user who gives the print instruction may designate a position at which the print output is performed or a time at which the print output is performed.

Further, in the print system 100 according to this exemplary embodiment, the user receives the IC card having the one-day user ID registered therein when entering the office 60 and returns the IC card when leaving the office 60, but for the users having authority capable of using the office 60, the fixed user ID may be allocated to each user, and the user may hold the IC card even after leaving the office 60.

In this case, from the viewpoint of improving security, when the server apparatus (step S320) receives the print instruction, the server apparatus may transmit one-time password that is valid only for the current print output to the client apparatus 10 that has given the print output instruction so that the one-time password is input when the authentication is performed before the print output. Alternatively, biological information such as a facial feature, a fingerprint, or the like of the user may be registered, and the user authentication may be performed using the biological information.

In the print system 100 according to the exemplary embodiment, the camera 50 has been described as being installed on the wall or the ceiling of the office 60, but the camera may be installed in the self-propelled printer 20.

Further, in the print system 100 according to the exemplary embodiment, it is determined whether or not the user is sitting on the seat using the camera 50, the user who has given the current print output is estimated to be sitting on the seat when someone is sitting on the seat, and the self-propelled printer 20 moves to the seat, but it may be confirmed whether or not the user who has given the current print output is sitting on the seat by performing face authentication, and then the self-propelled printer 20 may move to the seat. In this case, the camera may be installed in front of each seat so that the face authentication is performed with a high degree of certainty. Alternatively, even when the user is away from the seat, if the laptop PC 10A is placed on the seat, and the client apparatus 10 used by the user is the laptop PC 10A equipped with the camera other than the mobile terminal 10B, the face authentication may be performed using the camera of the laptop PC 10A, and the self-propelled printer 20 may move to the seat of the user after confirming that the user is sitting on his/her seat.

Alternatively, in the case of the system in which the right user is estimated to be sitting on the seat when the seat of the user is not empty, the camera need not be necessarily installed, and for example, a sensor such as a pyroelectric sensor or an infrared sensor that detects infrared rays radiated from a human body may be installed in front of each seat. In this case, the sensor corresponds to an example of a sitting recognizing apparatus.

Further, when the print output instruction is given from the user, the user may be regarded to be sitting on the seat with no particular sitting confirmation, and the self-propelled printer 20 may move toward the seat of the user. In this case, when the user is away from the seat, it is meaningless to send the self-propelled printer 20 to the seat of the user, but it is unnecessary to install a sitting confirming apparatus such as a camera or a sensor, and the configuration of the print system is simplified accordingly.

Here, the above description has been made in connection with the example of the print system 100 including the server apparatus 30 illustrated in FIG. 1, but the present invention can be applied even to a print system in which no server apparatus 30 is provided, and direct communication is performed among the client apparatus 10, the self-propelled printer 20, and the multifunction machine 40. In this case, the self-propelled printer 20 may double as the role of the server apparatus 30 in addition to the above-described role of the self-propelled printer 20. In the case of the system including the plural self-propelled printers, one self-propelled printer 20 may undertake the role of the server apparatus 30, or the role of the server apparatus 30 may be distributed to the plural self-propelled printers 20. A system including no server apparatus 30 is suitable for a small-scale print system in which for example, only one self-propelled printer 20 is provided. A modification to a system including no server apparatus 30 from the print system 100 when it is based on the print system 100 including the server apparatus 30 according to the exemplary embodiment is obvious, and a description thereof is here omitted.

The print system in which the self-propelled printer is provided to perform the print out at the destination has been described as an example of the service providing system according to the present invention, but the present invention is not necessarily limited to the print system. For example, the present invention can be applied to any service providing system in which a mobile apparatus and a stationary apparatus are provided, and responsibility to provide a service is transferable therebetween such as a delivery system for delivering documents or products.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A service providing system, comprising:
   a client apparatus that gives an instruction to provide a service according to an operation of the client apparatus by a user;
   a mobile apparatus that receives the instruction to provide the service, moves to the user who has performed the operation, performs authentication of the user, and provides the service to the user; and
   a stationary apparatus that is placed on a fixed position and provides a service,
   wherein, in a case where the authentication of the user fails although the mobile apparatus receives the instruction to provide the service and moves to the user who has performed the operation, the mobile apparatus stops the providing of the service and the mobile apparatus or a server apparatus transfers a role to provide the service to the stationary apparatus.

2. The service providing system according to claim 1, wherein
   the server apparatus includes at least one hardware processor and is configured to function as
      an instruction receiving unit that, when executed by the at least one hardware processor, receives the instruction to provide the service from the client apparatus,
      a service instructing unit that, when executed by the at least one hardware processor, instructs the mobile apparatus to provide the service according to the instruction received by the instruction receiving unit, and
      a service transfer unit that, when executed by the at least one hardware processor, transfers a role to provide the service to the stationary apparatus in a case where the authentication fails.

3. The service providing system according to claim 1, wherein, in response to a notification indicating that the mobile apparatus has transferred the providing of the service to the stationary apparatus, the client apparatus further gives an instruction to retransfer the service that is temporarily transferred to the stationary apparatus to the mobile apparatus according to an operation of the client apparatus by the user after the notification is received.

4. The service providing system according to claim 1, further comprising,
   a sitting recognizing apparatus that recognizes whether the user is sitting on a seat of the user who has performed the operation based on a predetermined criterion,
   wherein, when the instruction to provide the service is received though the sitting recognizing apparatus recognizes that the user is away from the seat of the user who has performed the operation, the mobile apparatus stops moving to the user.

5. A mobile apparatus that receives an instruction to provide a service, moves to a user who has given the instruction, performs authentication of the user, and provides the service to the user, comprising:
- a processor that stops the providing of the service and requests a stationary apparatus that is placed on a fixed position and provides a service with the providing of the service in a case where the authentication of the user fails although the mobile apparatus receives the instruction to provide the service and moves to the user who has given the instruction.

6. A server apparatus, comprising:
- an instruction receiving unit that, when executed by at least one hardware processor, receives an instruction to provide a service, the instruction being given from a client apparatus according to an operation of the client apparatus by a user;
- a service instructing unit that, when executed by the at least one hardware processor, instructs a mobile apparatus to provide the service corresponding to the instruction received by the instruction receiving unit, the mobile apparatus receiving the instruction to provide the service, moving to the user who has performed the operation, performing authentication of the user, and providing the service to the user; and
- a service transfer unit that, when executed by the at least one hardware processor, transfers a role to provide the service to a stationary apparatus that is placed on a fixed position and provides the service in a case where the authentication of the user fails although the mobile apparatus receives the instruction to provide the service and moves to the user who has performed the operation.

7. A service providing method comprising:
- receiving an instruction to provide a service, the instruction being given from a client apparatus according to an operation of the client apparatus by a user;
- instructing a mobile apparatus to provide the service corresponding to the instruction received, the mobile apparatus receiving the instruction to provide the service, moving to the user who has performed the operation, performing authentication of the user, and providing the service to the user; and
- transferring a role to provide the service to a stationary apparatus that is placed on a fixed position and provides the service in a case where the authentication of the user fails although the mobile apparatus receives the instruction to provide the service and moves to the user who has performed the operation.

8. A non-transitory computer readable medium storing a program to cause an information processing apparatus to function as:
- an instruction receiving unit that, when executed by at least one hardware processor, receives an instruction to provide a service, the instruction being given from a client apparatus according to an operation of the client apparatus by a user;
- a service instructing unit that, when executed by the at least one hardware processor, instructs a mobile apparatus to provide the service corresponding to the instruction received by the instruction receiving unit, the mobile apparatus receiving the instruction to provide the service, moving to the user who has performed the operation, performing authentication of the user, and providing the service to the user; and
- a service transfer unit that, when executed by the at least one hardware processor, transfers a role to provide the service to a stationary apparatus that is placed on a fixed position and provides a service in a case where the authentication of the user fails although the mobile apparatus receives the instruction to provide the service and moves to the user who has performed the operation.

* * * * *